United States Patent
Feng et al.

(10) Patent No.: US 11,982,996 B2
(45) Date of Patent: May 14, 2024

(54) METHOD AND APPARATUS FOR CONFIGURING PROCESSING PARAMETERS OF PRODUCTION EQUIPMENT, AND COMPUTER-READABLE MEDIUM

(71) Applicant: Siemens Aktiengesellschaft, Munich (DE)

(72) Inventors: Cheng Feng, Hangzhou (CN); Daniel Schneegass, Beijing (CN); Ying Qu, Beijing (CN); Peng Wei Tian, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 259 days.

(21) Appl. No.: 17/606,774

(22) PCT Filed: Apr. 29, 2019

(86) PCT No.: PCT/CN2019/085055
§ 371 (c)(1),
(2) Date: Oct. 27, 2021

(87) PCT Pub. No.: WO2020/220221
PCT Pub. Date: Nov. 5, 2020

(65) Prior Publication Data
US 2022/0206469 A1 Jun. 30, 2022

(51) Int. Cl.
*G05B 19/418* (2006.01)
*G05B 19/401* (2006.01)
(Continued)

(52) U.S. Cl.
CPC ....... *G05B 19/4183* (2013.01); *G05B 19/401* (2013.01); *G05B 19/408* (2013.01);
(Continued)

(58) Field of Classification Search
CPC .............. G05B 19/4183; G05B 19/401; G05B 19/408; G05B 19/4155; G05B 700/116
(Continued)

(56) References Cited

U.S. PATENT DOCUMENTS

2007/0168057 A1  7/2007  Blevins et al.
2011/0295403 A1  12/2011 Higuchi et al.
(Continued)

FOREIGN PATENT DOCUMENTS

CN  101488024 A  *  7/2009
CN  101488024 A     7/2009
(Continued)

OTHER PUBLICATIONS

Jaiswal Ayush et al: "Bidirectional Conditional Generative Adversarial Networks", arxiv.org, Cornell University Library, 201 Olin Library Cornell University Ithaca, NY 14853, Nov. 20, 2017,XP081300629.
(Continued)

*Primary Examiner* — Hien D Khuu
(74) *Attorney, Agent, or Firm* — Harness, Dickey & Pierce, P.L.C.

(57) ABSTRACT

A workpiece data processing method and apparatus are for accurately determining a relationship between production equipment processing parameters/ambient condition data and workpiece quality inspection results. A workpiece data method includes acquiring processing condition data, a quality attribute value and quality inspection result data of each of multiple workpieces processed by a piece of production equipment, the processing condition data of one workpiece including a processing parameter used by the production equipment when processing the workpiece and ambient condition data of the production equipment when processing the workpiece; determining a first relationship between the quality attribute value of the workpiece pro- (Continued)

cessed by the production equipment and the ambient condition data of the production equipment when processing the workpiece and the processing parameter of the production equipment; and determining a second relationship between the quality inspection result data and quality attribute value of the workpiece processed by the production equipment.

10 Claims, 6 Drawing Sheets

(51) Int. Cl.
    *G05B 19/408*     (2006.01)
    *G05B 19/4155*     (2006.01)

(52) U.S. Cl.
    CPC .............. *G05B 19/4155* (2013.01); *G05B 2219/32187* (2013.01); *G05B 2219/32193* (2013.01); *G05B 2219/34295* (2013.01)

(58) Field of Classification Search
    USPC ............................................... 700/116
    See application file for complete search history.

(56) References Cited

U.S. PATENT DOCUMENTS

| | | |
|---|---|---|
| 2013/0185039 A1 | 7/2013 | Tesauro et al. |
| 2017/0308049 A1 | 10/2017 | Fujii et al. |
| 2018/0150038 A1 * | 5/2018 | Lin .................. G05B 19/41875 |
| 2019/0019096 A1 | 1/2019 | Yoshida et al. |
| 2019/0041808 A1 * | 2/2019 | Hada ................ G05B 19/41875 |

FOREIGN PATENT DOCUMENTS

| | | | |
|---|---|---|---|
| CN | 103576646 A | | 2/2014 |
| CN | 1539298 B | * | 6/2016 |
| CN | 107122609 A | | 9/2017 |
| CN | 107194826 A | | 9/2017 |
| DE | 102012213504 A1 | * | 2/2014 |
| DE | 102017108169 A1 | * | 10/2017 |
| WO | WO 2007067645 A2 | | 6/2007 |
| WO | WO-2019025298 A1 | * | 2/2019 ............... G06N 3/08 |

OTHER PUBLICATIONS

Lu Yi Wei et al: "Conditional Generative Adversarial Network for Defect Classification with Class Imbalance", 2019 IEEE International Conference on Smart Manufacturing, Industrial & Logistics Engineering (SMILE), IEEE, Apr. 20, 2019, pp. 146-149, XP033692916.
International Search Report PCT/ISA/210 for PCT/CN2019/085055 dated Apr. 29, 2019.

* cited by examiner

METHOD AND APPARATUS FOR CONFIGURING PROCESSING PARAMETERS OF PRODUCTION EQUIPMENT, AND COMPUTER-READABLE MEDIUM

PRIORITY STATEMENT

This application is the national phase under 35 U.S.C. § 371 of PCT International Application No. PCT/CN2019/ 085055 which has an International filing date of Apr. 29 2019, which designated the United States of America 2020, the entire contents of which are hereby incorporated herein by reference.

FIELD

The present application generally relates to industrial Big Data technology, in particular to a method and apparatus for processing workpiece data, and a computer-readable medium.

BACKGROUND

The quality of a workpiece processed by a piece of production equipment is dependent to a large extent on the parameter settings of the production equipment. Taking a numerically controlled (CNC) machine tool as an example, changes in the settings of CNC processing parameters, e.g. cutting position, cutting angle, shaft height and clamping position, etc. will result in changes in quality attribute values of the processed workpiece. A workpiece of acceptable quality must undergo a quality inspection, i.e. the quality attribute values thereof must be acceptable in the quality inspection (generally, workpieces of different types must have different quality attributes inspected, e.g. in the case of a worm gear in the motor vehicle industry, it is necessary to inspect the average torque, transmission ratio and peak rotation speed, etc.). Thus, the setting of production equipment processing parameters is vital for the optimization of workpiece quality during the manufacture of workpieces, especially the manufacture of workpieces in the field of finishing.

At present, human experience is generally relied on when setting processing parameters of production equipment such as CNC production equipment, but the optimal setting of parameters might be influenced by the acceptable ranges for various quality attributes of workpieces; thus, the optimal setting of processing parameters is often difficult to achieve by relying on human experience alone. In addition, workpiece quality is likely to be affected by ambient conditions, e.g. by temperature and humidity during workpiece manufacture. Thus, when setting processing parameters, it is also necessary to take into account variation in ambient conditions, and this increases the difficulty of setting processing parameters.

As stated above, workpiece quality is related to the setting of production equipment processing parameters, and it is very difficult to optimize workpiece quality by the existing method of relying on human experience alone to set processing parameters. Workpiece quality is often measured by quality inspection, thus the question of how to set production equipment processing parameters so as to increase the workpiece quality inspection pass rate is a problem that is in urgent need of a solution.

One possible method is to determine a relationship between production equipment processing parameters and the workpiece quality inspection pass rate, in order to achieve automatic optimal setting of production equipment processing parameters. The relationship between workpiece production equipment processing parameters and the workpiece quality inspection pass rate can be determined by means of a machine learning algorithm. One way is to use a supervised learning algorithm, establish a model by learning a large amount of labelled data, and determine the relationship. However, in the case of manufacturing industry, data collection labelling is often quite difficult and consumes a huge amount of resources, and this is especially pronounced in non-digitized factories. If it is desired to determine the relationship between processing parameters of a piece of production equipment during manufacture and the quality inspection pass rate of workpieces processed by the equipment, a large amount of data is often needed. Suppose that it is desired to determine the quality pass rate of worm gears for the following CNC processing parameter settings: the y-axis cutting position is 91, the helix angle is −2.97, the z-axis height is 209.8, the ambient temperature is 7 degrees Celsius, and the humidity is 70%. In order to complete the abovementioned processing, it is generally necessary to collect several hundred worm gear samples to ensure statistical significance, and it is thereby possible to calculate an accurate worm gear quality inspection pass rate for a single combination of CNC processing parameters and ambient conditions. In practical production, it is generally not possible to obtain sufficient data; for each combination of CNC processing parameters and ambient conditions, there is often only a small number of items of labelled data, and an accurate relationship between CNC processing parameters and workpiece quality inspection results under different ambient conditions is difficult to obtain using a conventional regression model.

SUMMARY

Embodiments of the present invention provide a workpiece data processing method and apparatus, and a computer-readable medium, for accurately determining a relationship between production equipment processing parameters/ambient condition data and workpiece quality inspection results. It is then possible to determine optimal processing parameters on the basis of the relationship.

In a first embodiment, a workpiece data processing method is provided, comprising: acquiring processing condition data, a quality attribute value and quality inspection result data of each of multiple workpieces processed by a piece of production equipment, wherein the processing condition data of one workpiece comprises: a processing parameter used by the production equipment when processing the workpiece and ambient condition data of the production equipment when processing the workpiece; based on the processing condition data and quality attribute value of each of the multiple workpieces, determining a first relationship between the quality attribute value of the workpiece processed by the production equipment and the ambient condition data of the production equipment when processing the workpiece and the processing parameter of the production equipment; based on the quality attribute value and quality inspection result data of each of the multiple workpieces, determining a second relationship between the quality inspection result data and quality attribute value of the workpiece processed by the production equipment.

In a second embodiment, a workpiece data processing apparatus is provided, comprising: a workpiece data acquisition module, configured to acquire processing condition data, a quality attribute value and quality inspection result data of each of multiple workpieces processed by a piece of production equipment, wherein the processing condition data of one workpiece comprises: a processing parameter used by the production equipment when processing the workpiece and ambient condition data of the production equipment when processing the workpiece; a first relationship determining module, configured to determine a first relationship between the quality attribute value of the workpiece processed by the production equipment and the ambient condition data of the production equipment when processing the workpiece and the processing parameter of the production equipment, based on the processing condition data and quality attribute value of each of the multiple workpieces; a second relationship determining module, configured to determine a second relationship between the quality inspection result data and quality attribute value of the workpiece processed by the production equipment, based on the quality attribute value and quality inspection result data of each of the multiple workpieces.

In a third embodiment, a workpiece data processing apparatus is provided, comprising: at least one memory, for storing computer readable code; at least one processor, for executing the computer readable code stored in the at least one memory, to perform the method described in the first embodiment.

In a fourth embodiment, a processing parameter setting method is provided, comprising: for given ambient condition data, generating a set of processing parameters of the production equipment; for each element in the set, based on the given ambient condition data, the element and the first relationship, determining a quality attribute value of each of multiple second simulated workpieces processed on the basis of the processing parameter represented by the element, wherein the first relationship is a relationship between the quality attribute value of the workpiece processed by the production equipment and the ambient condition data of the production equipment when processing the workpiece and the processing parameter of the production equipment; for each element in the set, for each of the multiple second simulated workpieces, and based on the second relationship and the determined quality attribute value of the second simulated workpiece, determining quality inspection result data of the second simulated workpiece, wherein the second relationship is a relationship between the quality inspection result data and quality attribute value of the workpiece processed by the production equipment; for each element in the set, compiling statistics of a quality inspection pass rate according to the determined quality inspection result data of each of the multiple second simulated workpieces; repeating the following process until a preset condition is met, wherein the preset condition comprises the number of iterations reaching a maximum number of iterations or the calculated quality inspection pass rate of the workpiece processed by the production equipment reaching a pass rate threshold: adding a new element to the set, so that an expected value of the quality inspection pass rate obtained statistically on the basis of the new element has the largest increase compared with the maximum value of the quality inspection pass rate statistically obtained previously; for the new element added to the set, based on the given ambient condition data, the new element and the first relationship, determining a quality attribute value of each of multiple third simulated workpieces processed on the basis of the processing parameter represented by the new element; for the new element added to the set, for each of the multiple third simulated workpieces, and based on the second relationship and the determined quality attribute values of the multiple third simulated workpieces, determining quality inspection result data of each of the multiple third simulated workpieces; for the new element added to the set, compiling statistics of the quality inspection pass rate according to the determined quality inspection result data of each of the multiple third simulated workpieces; determining the element corresponding to the maximum value of all quality inspection pass rates obtained statistically as the optimal value of the processing parameter of the production equipment for the given ambient condition data.

In a fifth embodiment, a processing parameter setting apparatus is provided, comprising: a processing parameter set establishing module, configured to generate a set of processing parameters of the production equipment, for given ambient condition data; an adjustment module, configured to: for each element in the set, based on the given ambient condition data, the element and a first relationship, determine a quality attribute value of each of multiple second simulated workpieces processed on the basis of the processing parameter represented by the element, wherein the first relationship is a relationship between the quality attribute value of the workpiece processed by the production equipment and the ambient condition data of the production equipment when processing the workpiece and the processing parameter of the production equipment; for each element in the set, for each of the multiple second simulated workpieces, and based on a second relationship and the determined quality attribute value of the second simulated workpiece, determine quality inspection result data of the second simulated workpiece, wherein the second relationship is a relationship between the quality inspection result data and quality attribute value of the workpiece processed by the production equipment; for each element in the set, compile statistics of a quality inspection pass rate according to the determined quality inspection result data of each of the multiple second simulated workpieces; repeat the following process until a preset condition is met, wherein the preset condition comprises the number of iterations reaching a maximum number of iterations or the calculated quality inspection pass rate of the workpiece processed by the production equipment reaching a pass rate threshold: add a new element to the set, so that an expected value of the quality inspection pass rate obtained statistically on the basis of the new element has the largest increase compared with the maximum value of the quality inspection pass rate statistically obtained previously; for the new element added to the set, based on the given ambient condition data, the new element and the first relationship, determine a quality attribute value of each of multiple third simulated workpieces produced on the basis of the processing parameter represented by the new element; for the new element added to the set, for each of the multiple third simulated workpieces, and based on the second relationship and the determined quality attribute values of the multiple third simulated workpieces, determine quality inspection result data of each of the multiple third simulated workpieces; for the new element added to the set, compile statistics of the quality inspection pass rate according to the determined quality inspection result data of each of the multiple third simulated workpieces; an optimal processing parameter determining module, for determining the element corresponding to the maximum value of all quality inspection pass rates obtained statistically as the optimal value of the processing parameter of the production equipment for the given ambient condition data.

In a sixth embodiment, a computer readable medium is provided, the computer readable medium storing computer readable code; when the computer readable code is executed by at least one processor, the method provided in the first embodiment or the fourth embodiment is performed.

LIST OF REFERENCE LABELS

Figure 1:
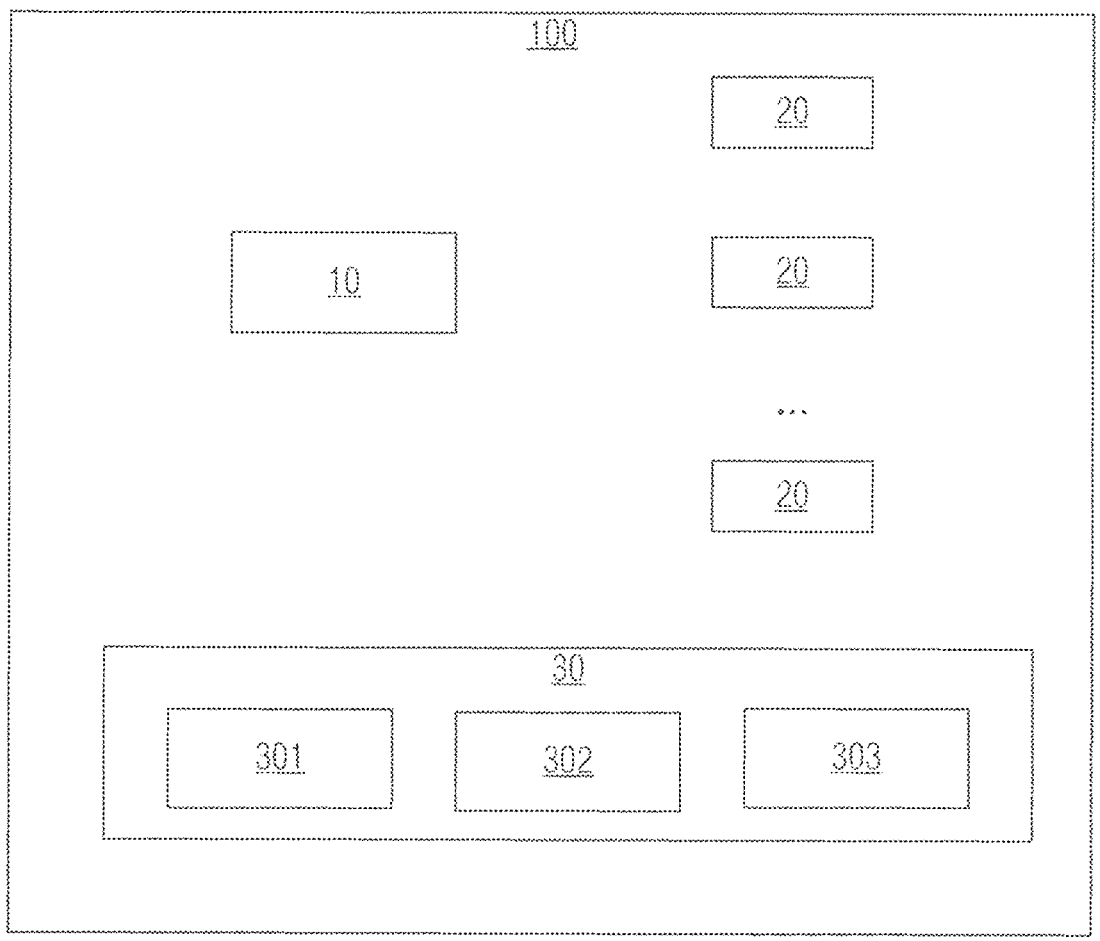
FIG. 1 is a schematic diagram of an industrial system provided in embodiments of the present invention.

100: industrial system; 10: production equipment; 20: workpiece processed by production equipment 10;
30: workpiece data processing apparatus
301: workpiece data processing apparatus; 302: verification apparatus; 303: processing parameter setting apparatus
200: workpiece data processing method
S201: acquire workpiece data; S202: determine first relationship; S203: determine second relationship
40: processing parameter; 50: quality attribute value; 60: quality inspection result
70: generating model; 80: classifier; 90: ambient condition data
701: discriminator; 702: generator
701c1, 701c2: input vector of discriminator 701
701b: hidden layer of discriminator; 701a: output of discriminator 701
702c1: noise input vector of generator 702; 702c2: input vector of generator 702; 702b: hidden layer of generator 702
702a: output vector of generator 702
500: verification method; S501: generate workpiece data; S502: data comparison
600: processing parameter setting method; S601: generate set of processing parameters; S602: generate quality attribute values
S603: determine quality inspection result data; S604: compile statistics of quality inspection pass rate; S605: add new element to set
S606: generate quality attribute value for new element; S607: determine quality inspection result data for new element; S608: compile statistics of quality inspection pass rate for new element
S609: judge whether preset condition is met; S610: determine optimal value of processing parameter
301a: workpiece data acquisition module; 301b: first relationship determining module; 301c: second relationship determining module
302a: simulated workpiece data generating module; 302b: data comparison module
303a: processing parameter set establishing module; 303b: adjustment module; 303c: optimal processing parameter determining module
304: memory; 305: processor; 306: I/O (input/output) interface
307: bus

DETAILED DESCRIPTION OF THE EXAMPLE EMBODIMENTS

In a first embodiment, a workpiece data processing method is provided, comprising: acquiring processing condition data, a quality attribute value and quality inspection result data of each of multiple workpieces processed by a piece of production equipment, wherein the processing condition data of one workpiece comprises: a processing parameter used by the production equipment when processing the workpiece and ambient condition data of the production equipment when processing the workpiece; based on the processing condition data and quality attribute value of each of the multiple workpieces, determining a first relationship between the quality attribute value of the workpiece processed by the production equipment and the ambient condition data of the production equipment when processing the workpiece and the processing parameter of the production equipment; based on the quality attribute value and quality inspection result data of each of the multiple workpieces, determining a second relationship between the quality inspection result data and quality attribute value of the workpiece processed by the production equipment.

In a second embodiment, a workpiece data processing apparatus is provided, comprising: a workpiece data acquisition module, configured to acquire processing condition data, a quality attribute value and quality inspection result data of each of multiple workpieces processed by a piece of production equipment, wherein the processing condition data of one workpiece comprises: a processing parameter used by the production equipment when processing the workpiece and ambient condition data of the production equipment when processing the workpiece; a first relationship determining module, configured to determine a first relationship between the quality attribute value of the workpiece processed by the production equipment and the ambient condition data of the production equipment when processing the workpiece and the processing parameter of the production equipment, based on the processing condition data and quality attribute value of each of the multiple workpieces; a second relationship determining module, configured to determine a second relationship between the quality inspection result data and quality attribute value of the workpiece processed by the production equipment, based on the quality attribute value and quality inspection result data of each of the multiple workpieces.

Unlike the previous method of directly determining a relationship between production equipment processing parameters and the workpiece quality inspection pass rate, in embodiments of the present invention, the first relationship between quality attribute values of the workpiece processed by the production equipment and production equipment processing parameters/ambient conditions during workpiece processing, and the second relationship between workpiece quality attribute values and workpiece quality inspection result data, are determined by processing workpiece data. By determining the first relationship and second relationship, it is possible to describe with relative accuracy the relationship between quality inspection results and production equipment processing parameters.

Optionally, when acquiring processing condition data, a quality attribute value and quality inspection result data of each of multiple workpieces processed by a piece of production equipment, it is possible to acquire the processing condition data, quality attribute value and quality inspection result data of each of multiple workpieces processed by the production equipment so that all of the acquired data covers as far as possible all combinations of ambient condition data and processing parameters. Thus, for each combination of production equipment processing parameters and ambient conditions, it is possible to use only a small amount of data to obtain a mathematical model of the first relationship by training.

Optionally, a conditional generative adversarial net (CGAN) model can be used to acquire a first relationship between distributions of workpiece quality attributes and production equipment processing parameters under different ambient conditions. Specifically, it is possible to use the processing condition data of each of the multiple workpieces as an input vector of a generator in a CGAN model; use the processing condition data of each of the multiple workpieces as an input vector of a discriminator of the CGAN model; use the quality attribute value of each of the multiple workpieces or an output vector of the generator of the CGAN model as another input vector of the discriminator in the CGAN model; train the CGAN model, and use the generator of the CGAN model obtained by training as the first relationship. For each combination of production equipment processing parameters and ambient conditions, it is possible to use only a small amount of data to obtain the CGAN model by training. For any combination of processing parameters and ambient conditions, the CGAN model obtained by training can generate any number of simulated workpiece samples. Using the method provided in embodiments of the present invention, the amount of data needed to determine the relationship between processing parameters and workpiece quality inspection results can be significantly reduced.

Optionally, it is possible to generate a quality attribute value of each of multiple first simulated workpieces, based on the processing condition data and quality attribute value of each of the multiple workpieces processed by the production equipment and the first relationship; and compare the multiple first simulated workpieces with the distribution of the acquired quality attribute values of the multiple workpieces processed by the production equipment, in order to determine the accuracy of the first relationship. By measuring the degree of similarity between real workpiece samples and simulated workpiece samples, it is possible to ensure that the simulated samples are able to fully represent the real workpieces.

In a third embodiment, a workpiece data processing apparatus is provided, comprising: at least one memory, for storing computer readable code; at least one processor, for executing the computer readable code stored in the at least one memory, to perform the method described in the first embodiment.

In a fourth embodiment, a processing parameter setting method is provided, comprising: for given ambient condition data, generating a set of processing parameters of the production equipment; for each element in the set, based on the given ambient condition data, the element and the first relationship, determining a quality attribute value of each of multiple second simulated workpieces processed on the basis of the processing parameter represented by the element, wherein the first relationship is a relationship between the quality attribute value of the workpiece processed by the production equipment and the ambient condition data of the production equipment when processing the workpiece and the processing parameter of the production equipment; for each element in the set, for each of the multiple second simulated workpieces, and based on the second relationship and the determined quality attribute value of the second simulated workpiece, determining quality inspection result data of the second simulated workpiece, wherein the second relationship is a relationship between the quality inspection result data and quality attribute value of the workpiece processed by the production equipment; for each element in the set, compiling statistics of a quality inspection pass rate according to the determined quality inspection result data of each of the multiple second simulated workpieces; repeating the following process until a preset condition is met, wherein the preset condition comprises the number of iterations reaching a maximum number of iterations or the calculated quality inspection pass rate of the workpiece processed by the production equipment reaching a pass rate threshold: adding a new element to the set, so that an expected value of the quality inspection pass rate obtained statistically on the basis of the new element has the largest increase compared with the maximum value of the quality inspection pass rate statistically obtained previously; for the new element added to the set, based on the given ambient condition data, the new element and the first relationship, determining a quality attribute value of each of multiple third simulated workpieces processed on the basis of the processing parameter represented by the new element; for the new element added to the set, for each of the multiple third simulated workpieces, and based on the second relationship and the determined quality attribute values of the multiple third simulated workpieces, determining quality inspection result data of each of the multiple third simulated workpieces; for the new element added to the set, compiling statistics of the quality inspection pass rate according to the determined quality inspection result data of each of the multiple third simulated workpieces; determining the element corresponding to the maximum value of all quality inspection pass rates obtained statistically as the optimal value of the processing parameter of the production equipment for the given ambient condition data.

In a fifth embodiment, a processing parameter setting apparatus is provided, comprising: a processing parameter set establishing module, configured to generate a set of processing parameters of the production equipment, for given ambient condition data; an adjustment module, configured to: for each element in the set, based on the given ambient condition data, the element and a first relationship, determine a quality attribute value of each of multiple second simulated workpieces processed on the basis of the processing parameter represented by the element, wherein the first relationship is a relationship between the quality attribute value of the workpiece processed by the production equipment and the ambient condition data of the production equipment when processing the workpiece and the processing parameter of the production equipment; for each element in the set, for each of the multiple second simulated workpieces, and based on a second relationship and the determined quality attribute value of the second simulated workpiece, determine quality inspection result data of the second simulated workpiece, wherein the second relationship is a relationship between the quality inspection result data and quality attribute value of the workpiece processed by the production equipment; for each element in the set, compile statistics of a quality inspection pass rate according to the determined quality inspection result data of each of the multiple second simulated workpieces; repeat the following process until a preset condition is met, wherein the preset condition comprises the number of iterations reaching a maximum number of iterations or the calculated quality inspection pass rate of the workpiece processed by the production equipment reaching a pass rate threshold: add a new element to the set, so that an expected value of the quality inspection pass rate obtained statistically on the basis of the new element has the largest increase compared with the maximum value of the quality inspection pass rate statistically obtained previously; for the new element added to the set, based on the given ambient condition data, the new element and the first relationship, determine a quality attribute value of each of multiple third simulated workpieces produced on the basis of the processing parameter represented by the new element; for the new element added to the set, for each of the multiple third simulated workpieces, and based on the second relationship and the determined quality attribute values of the multiple third simulated workpieces, determine quality inspection result data of each of the multiple third simulated workpieces; for the new element added to the set, compile statistics of the quality inspection pass rate according to the determined quality inspection result data of each of the multiple third simulated workpieces; an optimal processing parameter determining module, for determining the element corresponding to the maximum value of all quality inspection pass rates obtained statistically as the optimal value of the processing parameter of the production equipment for the given ambient condition data.

Using embodiments of the present invention, it is possible to automatically determine optimal processing parameters under any ambient conditions, to maximize the workpiece quality inspection pass rate. Unlike the previous method of directly determining a relationship between production equipment processing parameters and the workpiece quality inspection pass rate, in embodiments of the present invention, a first relationship between quality attribute values of the workpiece processed by the production equipment and production equipment processing parameters/ambient conditions during workpiece processing, and a second relationship between workpiece quality attribute values and workpiece quality inspection result data, are determined by processing workpiece data. It is possible to simulate a large number of workpiece quality attribute values according to the determined first relationship, and then simulate a large amount of workpiece quality inspection result data according to the determined second relationship, and on this basis compile statistics of the quality inspection pass rate; due to the fact that the simulated data satisfies statistical significance, and the simulation of data is based on the determined first relationship and second relationship, the statistically obtained quality inspection pass rates can be regarded as being relatively accurate. Optimal processing parameters can then be obtained on the basis of the relatively accurate quality inspection pass rates, thus achieving the optimal setting of production equipment processing parameters. By determining the first relationship and second relationship, it is possible to describe with relative accuracy the relationship between quality inspection results and production equipment processing parameters. In addition, based on the first relationship and second relationship, a large amount of data is simulated, relatively accurate quality inspection pass rates are obtained statistically, and optimal processing parameter settings are obtained on this basis.

Optionally, when adding a new element to the set, it is possible to fit a Gaussian process according to each element in the set and the quality inspection pass rate corresponding to the element that was statistically obtained previously, and then use the Gaussian process to calculate the new element.

In a sixth embodiment, a computer readable medium is provided, the computer readable medium storing computer readable code; when the computer readable code is executed by at least one processor, the method provided in the first embodiment or the fourth embodiment is performed.

In embodiments of the present invention, a data driven method is used to automatically set production equipment processing parameters, and workpiece quality optimization is achieved by analysis of workpiece data. Using embodiments of the present invention, it is possible to automatically determine optimal processing parameters under any ambient conditions, to maximize the workpiece quality inspection pass rate.

Unlike the previous method of directly determining a relationship between production equipment processing parameters and the workpiece quality inspection pass rate, in embodiments of the present invention, a first relationship between quality attribute values of the workpiece processed by the production equipment and production equipment processing parameters/ambient conditions during workpiece processing, and a second relationship between workpiece quality attribute values and workpiece quality inspection result data, are determined by processing workpiece data. It is possible to simulate a large number of workpiece quality attribute values according to the determined first relationship, and then simulate a large amount of workpiece quality inspection result data according to the determined second relationship, and on this basis compile statistics of the quality inspection pass rate; due to the fact that the simulated data satisfies statistical significance, and the simulation of data is based on the determined first relationship and second relationship, the statistically obtained quality inspection pass rates can be regarded as being relatively accurate. Optimal processing parameters can then be obtained on the basis of the relatively accurate quality inspection pass rates, thus achieving the optimal setting of production equipment processing parameters. By determining the first relationship and second relationship, it is possible to describe with relative accuracy the relationship between quality inspection results and production equipment processing parameters. In addition, based on the first relationship and second relationship, a large amount of data is simulated, relatively accurate quality inspection pass rates are obtained statistically, and optimal processing parameter settings are obtained on this basis.

In some embodiments of the present invention, a CGAN model can be used to obtain a relationship between production equipment processing parameters and workpiece quality attribute distribution under different ambient conditions. For each combination of production equipment processing parameters and ambient conditions, it is possible to use only a small amount of data to obtain the CGAN model by training. For any combination of processing parameters and ambient conditions, the CGAN model obtained by training can generate any number of simulated workpiece samples. Using the method provided in embodiments of the present invention, the amount of data needed to determine the relationship between processing parameters and workpiece quality inspection results can be significantly reduced.

In addition, in some embodiments of the present invention, the KS test (Kolmogorov-Smirnov test) can be used to measure the degree of similarity between real workpiece samples and simulated workpiece samples, so as to ensure that the simulated samples can fully represent the real workpieces.

The simulated workpiece samples can be used for a virtual quality inspection, and require virtually no expenditure. In particular, a classifier is trained, the classifier being able to predict a quality inspection result under given workpiece quality attribute conditions, and a virtual quality inspection is realized by training the classifier.

In some embodiments, a Bayesian optimization algorithm can also be used; based on the simulated workpiece samples generated by the CGAN model and virtual quality inspection results obtained for these simulated workpiece samples, optimal processing parameters that ensure optimal quality inspection results are automatically determined.

In order to clarify the object, technical solution and advantages of embodiments of the present invention, embodiments of the present invention are explained in further detail below with reference to the drawings. The embodiments described below are merely some, not all, of the embodiments of the present invention.

FIG. 1 is a schematic diagram of an industrial system provided in embodiments of the present invention. As shown in FIG. 1, the industrial system 100 comprises a piece of production equipment 10, and multiple workpieces 20 processed by the production equipment 10. In addition, the industrial system 100 may further comprise a workpiece data processing apparatus 30, configured to process data of the workpieces 20.

The workpiece data processing apparatus 30 may comprise: a workpiece data processing apparatus 301, configured to acquire data of the workpieces 20, and through data processing determine a relationship, called a "first relationship", between quality attribute values of the workpieces processed by the production equipment 10 and ambient condition data 90 of the production equipment 10 when processing the workpieces and quality data values of the workpieces processed by the production equipment 10; and determine a relationship, called a "second relationship", between quality inspection result data 60 and quality attribute values 50 of the workpieces processed by the production equipment 10.

The workpiece data processing apparatus 30 may further comprise a verification apparatus 302, configured to generate data of multiple simulated workpieces according to the first relationship, and compare the generated data of the simulated workpieces with data of the workpieces processed by the production equipment 10, so as to determine the accuracy of the first relationship.

In addition, the workpiece data processing apparatus 30 may further comprise a processing parameter setting apparatus 303, configured to determine the optimal value of a processing parameter 40 of the production equipment 10 for given ambient condition data 90, according to the first relationship and second relationship.

Figure 2:
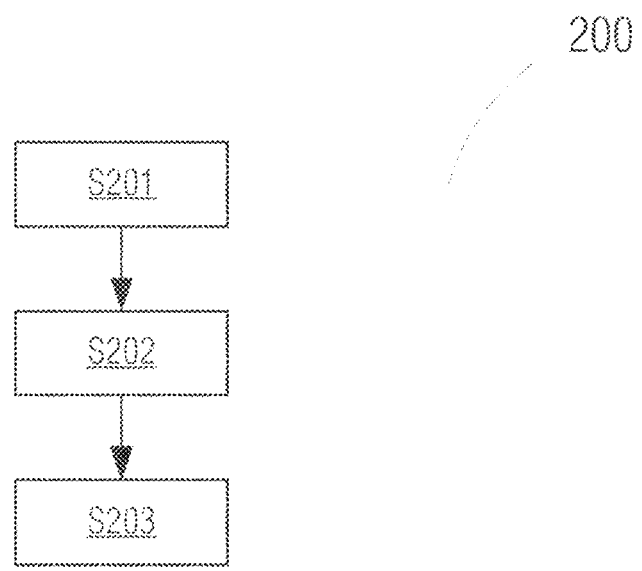
FIG. 2 is a flow chart of a workpiece data processing method provided in embodiments of the present invention.

FIG. 2 is a flow chart of a workpiece data processing method provided in embodiments of the present invention. The method 200 may be performed by the workpiece data processing apparatus 30, and as shown in FIG. 2, may comprise the following steps:

S201: acquiring workpiece data.

In step S201, the following data of each of multiple workpieces 20 processed by a piece of production equipment 10 is acquired:

1) processing condition data
wherein the processing condition data comprises:
processing parameters 40 used by the production equipment 10 when processing the workpieces 20, and
ambient condition data 90 of the production equipment 10 when processing the workpieces 20;
2) quality attribute values 50
3) quality inspection result data 60, for example: the quality inspection was passed, or the quality inspection was not passed.

Here, the multiple workpieces 20 may be some or all of the workpieces processed by the production equipment 10. In step S201, the acquired data covers as far as possible all combinations of ambient condition data 90 and processing parameters 40. For each combination of ambient condition data 90 and processing parameters 40, there is no need to define the amount of data acquired. That is, in embodiments of the present invention, there is no need to strive to acquire a large amount of workpiece data in order to satisfy statistical significance; all that is needed is for all combinations of ambient condition data 90 and processing parameters 40 to be covered as far as possible.

Figure 3:
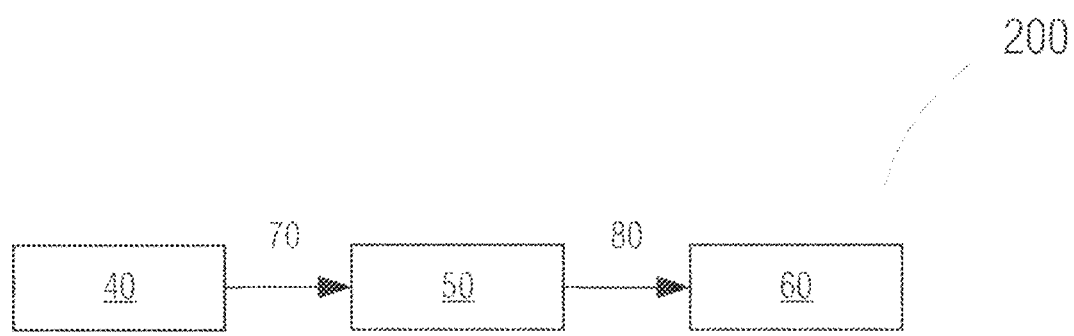
FIG. 3 is a schematic diagram showing the process of determining the two relationships in the workpiece data processing method provided in embodiments of the present invention.

After step S201, in embodiments of the present invention, the relationship between the quality inspection result data 60 of the workpieces processed by the production equipment 10 and the ambient condition data 90 of the production equipment 10 when processing the workpieces and the processing parameters 40 of the production equipment 10 is not determined directly; this is because, if the relationship were to be determined directly, the amount of workpiece data needed would be relatively large, in order to satisfy statistical significance. Suppose that the quality inspection result data comprises: the quality inspection was passed, and the quality inspection was not passed; then, for the same combination of processing parameters 40 and quality inspection result data 60, due to the influence of some random factors, it is possible that one workpiece 20 obtained by processing by the production equipment 10 passed the quality inspection, whereas another workpiece 20 did not pass the quality inspection. If the amount of data is small, i.e. the number of workpiece samples is small, the relationship obtained statistically is not accurate. As shown in FIG. 3, in embodiments of the present invention, if the amount of workpiece data is small, the first relationship between the quality attribute values 50 of the workpieces processed by the production equipment 10 and the ambient condition data 90 of the production equipment 10 when processing the workpieces and the processing parameters 40 of the production equipment 10 is determined by means of a generating model 70 for example, and the second relationship between the quality inspection result data 60 and quality attribute values 50 of the workpieces processed by the production equipment 10 is then determined by means of a classifier 80 for example. Since the quality inspection result data 60 is determined from the quality attribute values 50, the result is not influenced much by random factors, and therefore the determined second relationship between the quality attribute values 50 and quality inspection result data 60 is relatively accurate.

S202: determining the first relationship.

In step S202, the first relationship between the quality attribute values 50 of the workpieces processed by the production equipment 10 and the ambient condition data 90 of the production equipment 10 when processing the workpieces and the processing parameters 40 of the production equipment 10 can be determined according to the processing condition data and quality attribute values 50 of each of the multiple workpieces 20.

Figure 4:
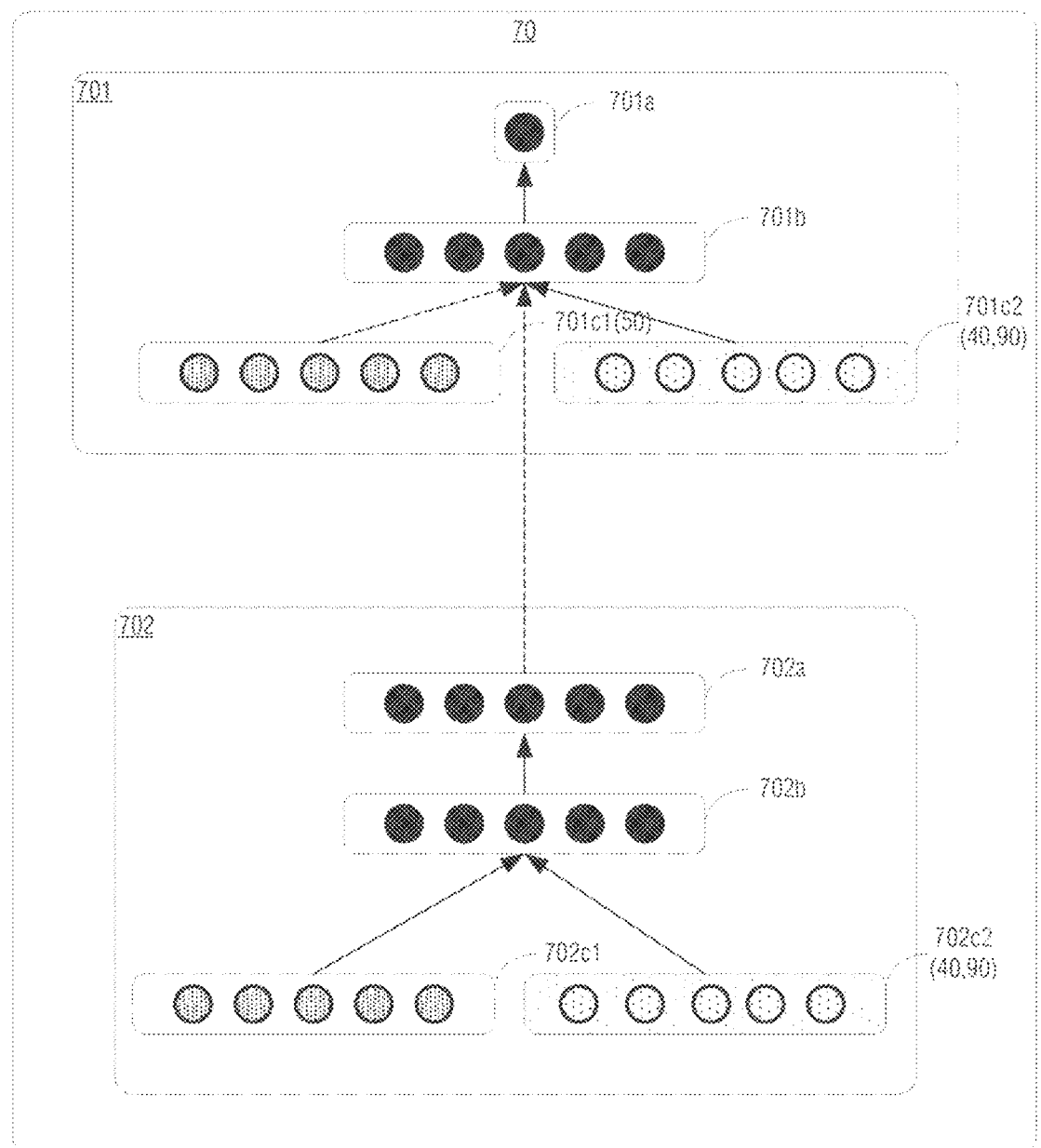
FIG. 4 is a schematic diagram showing a CGAN model being used to determine the first relationship in the workpiece data processing method provided in embodiments of the present invention.

Optionally, the first relationship is determined by training the CGAN model 70. Specifically, as shown in FIG. 4, the CGAN model 70 comprises two sub-models: a generator 702 (abbreviated "G") and a discriminator 701 (abbreviated "D").

The generator 702 of the CGAN model 70 may comprise two input vectors (z, y) and one output vector ((G(z|y))).

The two input vectors comprise:
1) a noise vector 702$c1$ (z), comprising a floating point number with a value between 0-1, generated randomly.
2) a condition vector 702$c2$ (y), which is processing condition data of each of the multiple workpieces 20 (a combination of processing parameters 40 and ambient condition data 90).

The output vector (G(z|y)) of the generator 702 is the simulated workpiece quality attribute value 50.

The objective of the generator 702 is to generate a simulated quality attribute value 50, so that the discriminator 701 is unable to distinguish between the simulated quality attribute value 50 and a real quality attribute value 50 (i.e. the quality attribute value 50 of the workpiece 20 processed by the production equipment 10). This objective can be represented mathematically as follows:

$$\min_{G} E_{z\sim p(z)} D(G(z|y)|y)$$

where p(z) is a uniform distribution of multiple variables independent of each other, with a value of 0-1.

The discriminator 701 of the CGAN model 70 also has two input vectors and one output; the output is a scalar.

The two input vectors comprise:
1) a condition vector 701$c2$ (y), being the same as one condition vector 702$c2$ of the generator 702.
2) the simulated workpiece quality attribute value 50 (G(z|y)) or the real workpiece quality attribute value 50 (i.e. the quality attribute value 50 of the workpiece processed by the production equipment 10 that was acquired in step S201).

The output of the discriminator 701 of the CGAN model 70 is a scalar, (D(x'|y)), if the value is greater, this indicates that the discriminator 701 concludes that there is a greater possibility of x' being the quality attribute value 50 of the simulated workpiece. The objective of the discriminator 701 is to distinguish between the real quality attribute value 50 and the simulated quality attribute value 50, and this can be represented mathematically as follows:

$$\min_{D} E_{z\sim p(x)} D(x|y) - E_{z\sim p(x)} D(G(z|y)|y) + \omega E_{x'\sim p(x')} \left[\left(\left\|\frac{\Delta D(x'|y)}{\Delta x'}\right\| - 1\right)^{\wedge}2\right]$$

wherein p(x) is the distribution of the real quality attribute value 50. In the above formula, the first part minimizes the output for the real quality attribute value 50; the second part maximizes the output for the simulated quality attribute value 50 outputted by the generator 702; and the third part is the gradient penalty loss (see the article "Improved training of Wasserstein GANs" published on pages 5767-5777 in "Advances in Neural Information Processing Systems" by Gulrajani, Ishaan, Faruk Ahmed, Martin Arjovsky, Vincent Dumoulin and Aaron C. Courville in 2017, the entire contents of which are hereby incorporated herein by reference), where ω is a hyperparameter, generally with a value of 10. p(x') is assigned values uniformly along a straight line between the real quality attribute value 50 and the simulated quality attribute value 50, in order to avoid gradient disappearance or surge during training.

Figure 7:
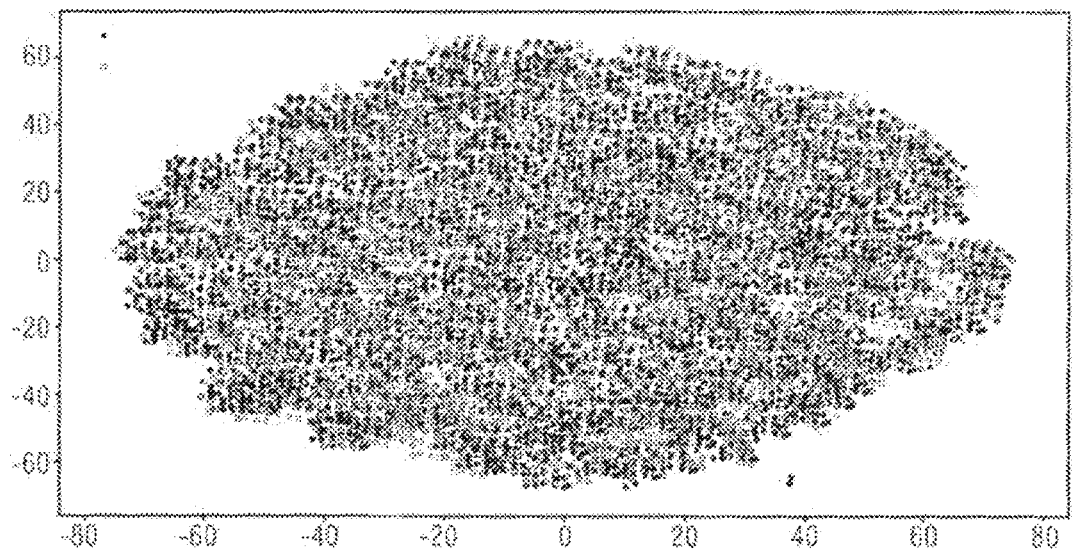
FIG. 7 is a schematic diagram comparing simulated workpiece data generated using a CGAN model and real workpiece data in an embodiment of the present invention.

The target functions of the generator 702 and the discriminator 701 can be minimized alternately by multiple iterations to train the CGAN model 70, until the discriminator 701 is unable to distinguish between the real quality attribute value 50 and the simulated quality attribute value 50. The generator 702 can then be used to generate a large amount of simulated quality attribute values 50 for any processing parameters 40 and any ambient condition data 90. On this basis, the distribution of simulated quality attribute values 50 is close to the distribution of real quality attribute values 50. FIG. 7 shows the distribution of simulated quality attribute values 50 generated by the CGAN model and quality data values of actual workpieces collected from a worm gear factory, under the same CNC processing parameter and ambient conditions. In the figure, high-dimensional quality attribute values are mapped to two dimensions by a dimensionality reduction method, for convenience of display. The solid circles represent real quality attribute values 50, while the hollow circles represent simulated quality attribute values 50.

S203: determining the second relationship.

In step S203, based on the quality attribute values and quality inspection result data of each of the multiple workpieces 20, the second relationship between the quality inspection result data 60 and quality attribute values 50 of the workpieces processed by the production equipment 10 can be determined.

If the quality inspection result data 60 is that the quality inspection was passed or the quality inspection was not passed, the classifier 80 can be used to determine the second relationship. In fact, as long as optimal classification precision can be attained, any classifier can be selected, e.g. a random forest or support vector machine, and it is even possible to use a predefined acceptable range in this step to examine the quality attribute values 50. Specifically, an input of the classifier 80 is the quality attribute value 50 of the workpiece 20 that was acquired in step S201, and an output is the quality inspection result data 60 of the workpiece 20. The classifier 80 is trained on the basis of the real data acquired in step S201. When training has ended, the classifier 80 can be used to perform classification of whether the simulated quality attribute value 50 passes the quality inspection, and this can be regarded as a virtual quality test.

Figure 5:
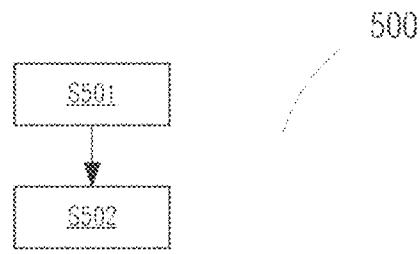
FIG. 5 is a flow chart of a verification method provided in embodiments of the present invention.

FIG. 5 is a flow chart of a verification method provided in embodiments of the present invention. The verification method 500 may be performed by the verification apparatus 302 in FIG. 1. As shown in FIG. 5, the method may comprise the following steps:

S501: generating workpiece data.

In step S501, quality attribute values 50 of multiple first simulated workpieces 20 can be generated according to processing condition data 40 and quality attribute values 50 of each of multiple workpieces 20 processed by the production equipment 10.

Optionally, if the first relationship is obtained by training the CGAN model 70, the generator 702 in the CGAN model can be used here to generate a large number of simulated quality attribute values 50.

S502: comparing the first simulated workpieces 20 generated in step S501 with the distribution of acquired quality attribute values of multiple workpieces 20 processed by the production equipment 10, to determine the accuracy of the first relationship.

Optionally, the Kolmogorov-Smirnov test can be used to quantitatively measure the similarity between the real quality attribute values 50 and the simulated quality attribute values 50, so as to ensure that the simulate quality attribute values 50 can fully represent the real quality attribute values 50. In statistics, the Kolmogorov-Smirnov test (k-s test or ks test) is a non-parametric test, which can be used to compare whether the continuous one-dimensional probability distributions of two samples are equal. Here, the multivariate generalization of the test is used to examine whether the difference between the simulated quality attribute values 50 and the real quality attribute values 50 has statistical significance (see the article "Multivariate generalizations of the Wald-Wolfowitz and Smirnov two-sample tests" published on pages 679-717 of "The Annals of Statistics" in 1979 by Jerome H. Friedman and Lawrence C. Rafsky, the entire contents of which are hereby incorporated herein by reference). After determining that the simulated quality attribute values 50 are very close to the real quality attribute values 50, the simulated quality attribute values 50 can be further used to perform quality analysis.

After obtaining the first relationship and second relationship, it is possible to assess the quality inspection pass rate of the workpiece under any ambient conditions, for any set processing parameters. One violent method of seeking the optimized setting of processing parameters of production equipment is to enumerate all possible parameter settings, and select the parameters with the highest quality inspection pass rate. However, this method has too high a cost, and is sometimes unacceptable, especially in the case where ambient conditions are changing rapidly and the optimal processing parameters need to be adjusted dynamically. Thus, a method for setting processing parameters is also provided in embodiments of the present invention, as shown in FIG. 6.

Figure 6:
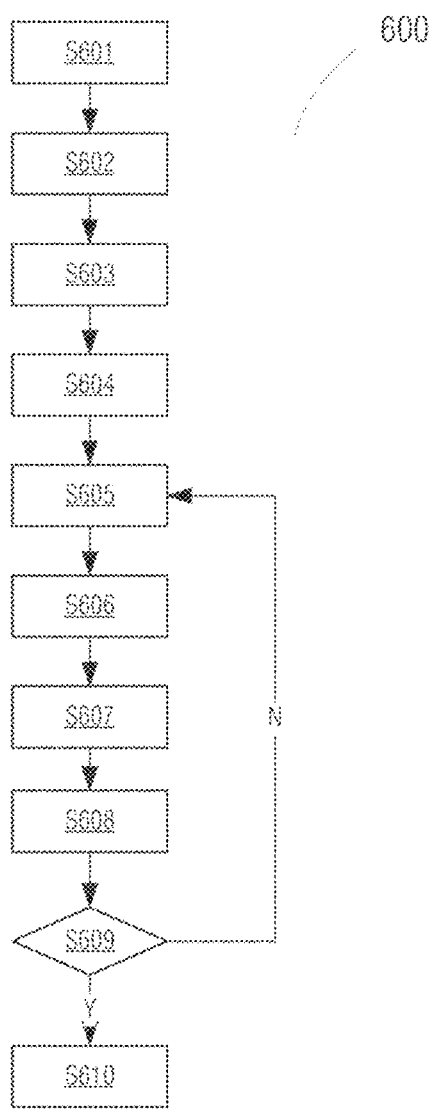
FIG. 6 is a flow chart of a processing parameter setting method provided in embodiments of the present invention.

FIG. 6 is a flow chart of the method for setting processing parameters provided in embodiments of the present invention. The method 600 for setting processing parameters may be performed by the processing parameter setting apparatus 303 in FIG. 1. As shown in FIG. 6, the method may comprise the following steps:

S601: generating a set of processing parameters 40.

In step S601, for given ambient condition data, a set of processing parameters 40 of a piece of production equipment 10 is generated, wherein the set of processing parameters 40 can be generated randomly. Taking CNC as an example, M processing parameters 40 are generated randomly, wherein M is a positive integer.

S602: generating quality attribute values 50.

In step S602, for each element in the set generated in step S601, quality attribute values 50 of multiple second simulated workpieces 20 are generated according to given ambient condition data 90, the element and the first relationship. Still taking CNC as an example, in the case of given ambient condition data 90, for each of the M processing parameters 40 generated randomly in step S601 above, the CGAN model 70 is used to respectively generate a large number of quality attribute values 50.

S603: determining quality inspection result data 60.

In step S603, for each element in the set, based on the second relationship and the generated quality attribute values of multiple second simulated workpieces 20, quality inspection result data 60 of each second simulated workpiece 20 is determined. Still taking CNC as an example, for each of the M processing parameters 40 generated randomly in step S601 above, the second relationship mentioned above is used to generate quality inspection result data 60 corresponding to each quality attribute value 50, based on the large number of quality attribute values 50 corresponding to the processing parameter 40 that were generated in step S602.

S604: compiling statistics of the quality inspection pass rate.

In step S604, for each element in the set, statistics are compiled of the quality inspection pass rate corresponding to the element separately according to the determined quality inspection result data 60 of multiple second simulated workpieces 20 corresponding to the element. Still taking CNC as an example, for each of the M processing parameters 40 generated randomly in step S601, based on the large amount of quality inspection result data 60 corresponding to the processing parameter 40, statistics are compiled of the quality inspection pass rate of the workpiece processed by CNC using the processing parameter 40.

After step S604, steps S605-S608 are repeated, until a preset condition is met. The preset condition can be set according to actual circumstances. For example: the number of iterations reaches a maximum number of iterations; or for example: the calculated quality inspection pass rate of the workpiece processed by the production equipment 10 reaches a pass rate threshold; or for example: one of two conditions is met, specifically, the number of iterations reaches the maximum number of iterations or the calculated quality inspection pass rate of the workpiece processed by the production equipment 10 reaches a pass rate threshold, at which point the cycle is exited.

S605: adding a new element to the set.

In step S605, a new element is added to the set, so that an expected value of the quality inspection pass rate obtained statistically on the basis of the new element has the largest increase compared with the maximum value of the quality inspection pass rate statistically obtained previously. It is possible to fit a Gaussian process (GP) according to each element in the set and the quality inspection pass rate corresponding to the element that was statistically obtained previously (see "Gaussian Processes in Machine Learning" published on pages 63-71 of "Gaussian Processes in Machine Learning" in 2004 by Rasmussen, Carl Edward, the entire contents of which are hereby incorporated herein by reference), and use the Gaussian process to calculate a new element. Still taking CNC as an example, a Gaussian process can be fitted, taking all elements in the set, i.e. each processing parameter 40 as the input of the Gaussian process, and taking the quality inspection pass rate corresponding to each processing parameter 40 as the output of the Gaussian process.

Specifically, Bayesian optimization (see "A Tutorial on Bayesian Optimization" published in arXiv preprint arXiv: 1807.02811 in 2018 by Frazier, Peter I., the entire contents of which are hereby incorporated herein by reference) can be used to search effectively for a candidate space of processing parameters 40. Then for each processing parameter 40 setting in a given set, a Gaussian process is used to estimate a posterior distribution of the workpiece quality inspection pass rate of all unsearched settings:

$$P(y|x, \theta D)$$

where x is the unsearched setting, θ is a parameter of the Gaussian process, and D is an estimated value of each searched setting and the respectively corresponding workpiece quality inspection pass rate. Then, we can effectively search for a space of processing parameters 40 by selecting a setting that increases the quality inspection pass rate expected value to the maximum extent; the calculation formula is as follows:

$$\max_x \int \max(y - \hat{y}, 0) P(y \mid x, 0, D) dy$$

where ŷ denotes the highest quality inspection pass rate in the searched settings. For a detailed explanation of the above formula, see "A Tutorial on Bayesian Optimization" mentioned above.

Using the Bayesian optimization method described above, optimized setting of processing parameters 40 is achieved for specific ambient condition data 90.

S606: generating a quality attribute value for the new element.

In step S606, based on given ambient condition data, the new element and the abovementioned first relationship, a quality attribute 50 of each of multiple third simulated workpieces 20 produced on the basis of the processing parameter represented by the new element is determined.

S607: determining quality inspection result data for the new element.

In step S607, for the new element, and for each of multiple third simulated workpieces 20, based on the abovementioned second relationship and the determined quality attribute values of the multiple third simulated workpieces 20, quality inspection result data 60 of each of the multiple third simulated workpieces 20 is determined.

S608: compiling statistics of the quality inspection pass rate for the new element.

In step S608, for the new element added to the set, statistics are compiled of the quality inspection pass rate according to the determined quality inspection result data of each of multiple third simulated workpieces 20. S609: judging whether the abovementioned preset condition is met. If the abovementioned preset condition is met, then the cycle is exited and step S610 is performed, otherwise the method returns to step S605.

S610: determining the optimal value of the processing parameter.

An element corresponding to the maximum value of all quality inspection pass rates obtained statistically is determined as being the optimal value of the processing parameter of the production equipment 10 for given ambient condition data.

In the procedure shown in FIG. 6, the number of iterations is N, and the initial setting is 0. The values of N and the number M of elements in the set of processing parameters 40 generated in step S601 can be determined by the number of processing parameters 40 that need to be taken into account. Taking CNC as an example, the number of CNC processing parameters is generally less than 10, therefore it is possible to set M as 5 and set N as 10 here. The values of M and N can specifically be adjusted according to experiment.

Figure 8:
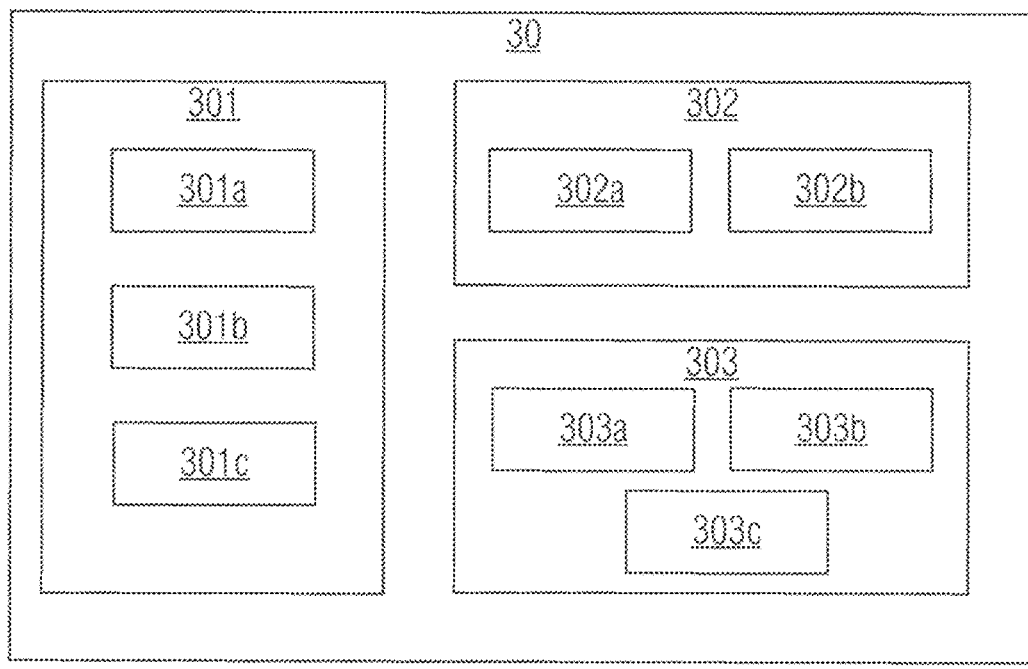
FIG. 8 is a structural schematic diagram of a workpiece data processing apparatus provided in embodiments of the present invention.

FIG. 8 is a structural schematic diagram of a workpiece data processing apparatus provided in embodiments of the present invention. The workpiece data processing apparatus 30 may comprise: a workpiece data processing apparatus 301, and optionally may further comprise a verification apparatus 302 and/or a processing parameter setting apparatus 303.

The workpiece data processing apparatus 301 may comprise: a workpiece data acquisition module 301a, configured to acquire processing condition data, quality attribute values and quality inspection result data of each of multiple workpieces 20 processed by a piece of production equipment 10, wherein the processing condition data of one workpiece 20 comprises: processing parameters used by the production equipment 10 when processing the workpiece 20 and ambient condition data of the production equipment 10 when processing the workpiece 20; a first relationship determining module 301b, configured to determine a first relationship between the quality attribute values of the workpieces processed by the production equipment 10 and the ambient condition data of the production equipment 10 when processing the workpieces and the processing parameters of the production equipment 10 according to the processing condition data and quality attribute values of each of the multiple workpieces 20; a second relationship determining module 301c, configured to determine a second relationship between quality inspection result data and quality attribute values of the workpieces processed by the production equipment 10, according to the quality attribute values and quality inspection result data of each of multiple workpieces 20.

Optionally, the workpiece data acquisition module 301a is specifically configured to: acquire processing condition data, quality attribute values and quality inspection result data of each of multiple workpieces 20 processed by a piece of production equipment 10, so that all of the acquired data covers as far as possible all combinations of ambient condition data and processing parameters.

Optionally, the first relationship determining module 301b is specifically configured to: use the processing condition data of each of the multiple workpieces 20 as an input vector of a generator 702 in a CGAN model; use the processing condition data of each of the multiple workpieces 20 as an input vector of a discriminator 701 of the CGAN model; use a quality attribute value of each of the multiple workpieces 20 or an output vector 702a of the generator of the CGAN model as another input vector of the discriminator 701 in the CGAN model; and train the CGAN model, and use the generator 701 of the CGAN model obtained by training as the first relationship.

The verification apparatus 302 may comprise: a simulated workpiece data generating module 302a, configured to generate quality attribute values of multiple first simulated workpieces according to the processing condition data and quality attribute values of each of the multiple workpieces 20 processed by the production equipment 10 and the first relationship; a data comparison module 302b, configured to compare the multiple first simulated workpieces 20 with the distribution of acquired quality attribute values of multiple workpieces 20 processed by the production equipment 10, so as to determine the accuracy of the first relationship.

The processing parameter setting apparatus 303 may comprise:

a processing parameter set establishing module 303a, configured to generate a set of processing parameters of a piece of production equipment 10 for given ambient condition data;

an adjustment module 303b, configured to determine, for each element in the set and according to given ambient condition data, the element and a first relationship, a quality attribute value of each of multiple second simulated workpieces processed on the basis of the processing parameter represented by the element, wherein the first relationship is a relationship between quality attribute values of the workpieces processed by the production equipment 10 and the ambient condition data of the production equipment 10 when processing the workpieces and the processing parameters of the production equipment 10; for each element in the set, and for each of the multiple second simulated workpieces 20, determine quality inspection result data of the second simulated workpiece 20 according to a second relationship and the determined quality attribute value of the second simulated workpiece 20, wherein the second relationship is a relationship between quality inspection result data and quality attribute values of the workpieces processed by the production equipment 10; for each element in the set, compile statistics of a quality inspection pass rate according to the determined quality inspection result data of each of the multiple second simulated workpieces 20;

the adjustment module 303b being further configured to repeat the following process until a preset condition is met, wherein the preset condition comprises the number of iterations reaching a maximum number of iterations or a calculated quality inspection pass rate of the workpiece processed by the production equipment 10 reaching a pass rate threshold: add a new element to the set, so that an expected value of the quality inspection pass rate obtained statistically on the basis of the new element has the largest increase compared with the maximum value of the quality inspection pass rate statistically obtained previously; for the new element added to the set, based on given ambient condition data, the new element and the first relationship, determine a quality attribute value of each of multiple third simulated workpieces 20 produced on the basis of the processing parameter represented by the new element; for the new element added to the set, and for each of the multiple third simulated workpieces 20, determine quality inspection result data of each of the multiple third simulated workpieces 20 according to the second relationship and the determined quality attribute values of the multiple third simulated workpieces 20; for the new element added to the set, compile statistics of the quality inspection pass rate according to the determined quality inspection result data of each of the multiple third simulated workpieces 20; and an optimal processing parameter determining module 303c, configured to determine the element corresponding to the maximum value of all quality inspection pass rates obtained statistically, as the optimal value of the processing parameter of the production equipment 10 for given ambient condition data.

Optionally, when adding a new element to the set, so that an expected value of the quality inspection pass rate obtained statistically on the basis of the new element has the largest increase compared with the maximum value of the quality inspection pass rate statistically obtained previously, the adjustment module 303b is specifically configured to: fit a Gaussian process according to each element in the set and the quality inspection pass rate corresponding to the element that was statistically obtained previously; and use the Gaussian process to calculate a new element.

Figure 9:
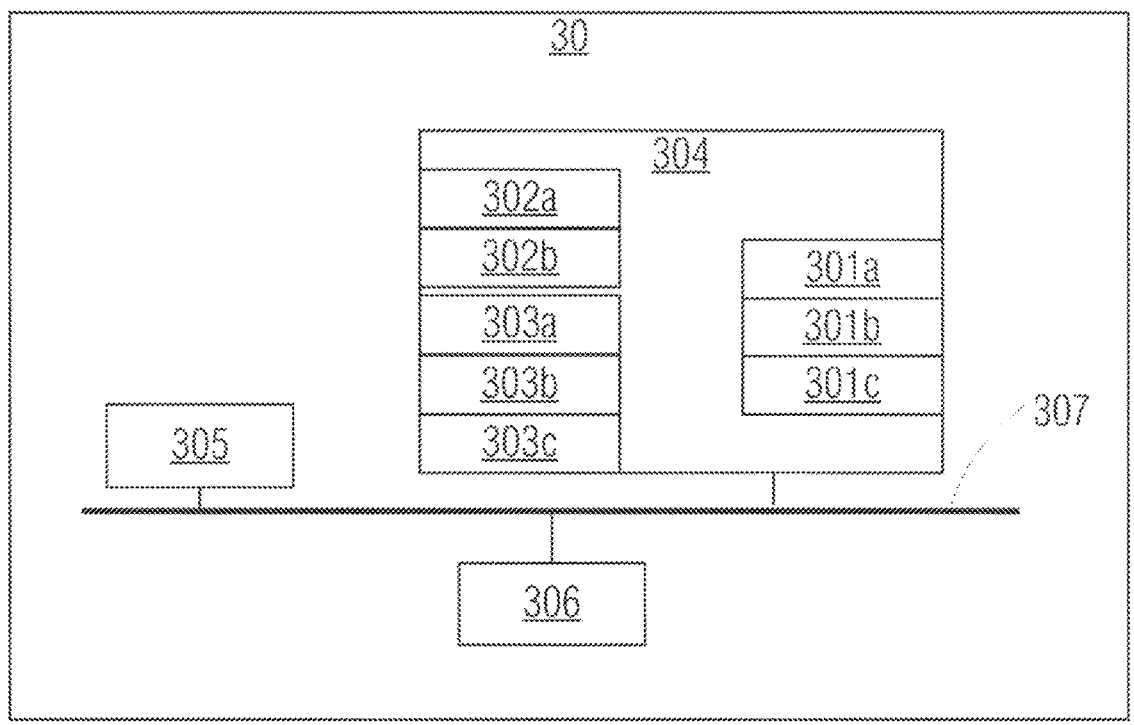
FIG. 9 is another structural schematic diagram of a workpiece data processing apparatus provided in embodiments of the present invention.

FIG. 9 is another structural schematic diagram of a workpiece data processing apparatus 30 provided in embodiments of the present invention. As shown in FIG. 9, in this structure, the workpiece data processing apparatus 30 may comprise at least one memory 304, for storing computer readable code; at least one processor 305, configured to execute the computer readable code stored in the at least one memory 304, to perform the method 200 described above, and optionally, the method 500 and/or method 600 described above. The various modules shown in FIG. 8 may be regarded as program modules written with the computer readable code stored in the memory 304; when these program modules are called by the processor 305, the method 200, 500 and/or 600 described above can be performed. The workpiece data processing apparatus 30 may further comprise an I/O interface 306; the I/O interface may be connected to an external device such as a mouse or a display. Optionally, the at least one memory 304, at least one processor 305 and I/O interface 306 can communicate with each other via a bus 307.

In addition, a computer readable medium is also provided in embodiments of the present invention, the computer readable medium storing computer readable code; when the computer readable code is executed by at least one processor, the method 200, 500 and/or 600 described above is performed.

In summary, embodiments of the present invention provide a workpiece data processing method and apparatus and a computer readable medium, for accurately determining a relationship between production equipment processing parameters/ambient condition data and workpiece quality inspection results. It is then possible to determine optimal processing parameters according to the relationship.

The workpiece data processing method provided in embodiments of the present invention is purely data driven, and compared with a method driven by human experience, significantly increases the accuracy, efficiency and versatility of the process of setting optimal processing parameters for workpiece processing.

The solution provided in embodiments of the present invention is cost-effective, predicting the pass rate of workpieces produced under given processing parameters and ambient conditions and constructing a data quantity required for a mathematical model. Using the solution provided in embodiments of the present invention, it is only necessary to search for a small part of a processing parameter candidate space, in order to find the optimal processing parameters.

In embodiments of the present invention, a CGAN model is used to simulate a quality attribute value of a workpiece for a given processing parameter, and then a classifier is used to perform a virtual quality inspection in order to determine the quality inspection pass rate of the workpiece. Using the solution provided in embodiments of the present invention, it is possible to use only a small amount of workpiece data to determine the relationship between the production equipment processing parameters and quality inspection result data. Compared with a method that relies on human experience alone, the determined relationship is more accurate.

In embodiments of the present invention, a Bayesian optimization method can be relied on to automatically and effectively find the optimal setting of processing parameters of production equipment, so as to obtain the highest workpiece quality inspection pass rate under any ambient conditions.

It must be explained that in the various procedures and various system structural diagrams above, not all of the steps and modules are necessary; some steps or modules can be omitted according to actual needs. The order in which the steps are performed is not fixed, and can be adjusted according to needs. The system structures described in the various embodiments above may be physical structures or logic structures, i.e. some modules might be realized by the same physical entity, or some modules might be realized by at least two physical entities, or may be realized jointly by some components in at least two independent devices.

In the embodiments above, hardware units can be realized mechanically or electrically. For example, one hardware unit may comprise permanent dedicated circuitry or logic (such as a special processor, field-programmable gate array (FPGA) or application specific integrated circuits (ASIC), etc.) to complete the corresponding operations. Hardware units may further comprise programmable logic or circuitry (such as a general-purpose processor or other programmable processor), and can be set temporarily by software in order to complete the corresponding operations. The specific manner of implementation (mechanical, or dedicated permanent circuitry, or temporarily set circuitry) can be determined on the basis of cost and time considerations.

Embodiments of the present invention have been shown and explained in detail above by means of the drawings and preferred embodiments, but the embodiments of the present invention are not limited to these disclosed embodiments. Based on the embodiments above, those skilled in the art will know that code review means in different embodiments above can be combined to obtain more embodiments of the present invention, such embodiments also being within the scope of protection of embodiments of the present invention.

The invention claimed is:

1. A workpiece data processing method, comprising:
acquiring processing condition data, a quality attribute value and quality inspection result data of each workpiece of multiple workpieces processed by production equipment, the processing condition data of a workpiece of the multiple workpieces including a processing parameter used by the production equipment when processing the workpiece and ambient condition data of the production equipment when processing the workpiece;
determining, based on the processing condition data and the quality attribute value of each workpiece of the multiple workpieces, a first relationship between the quality attribute value of the workpiece processed by the production equipment and the ambient condition data of the production equipment when processing the workpiece and the processing parameter of the production equipment;
determining, based on the quality attribute value and the quality inspection result data of each workpiece of the multiple workpieces, a second relationship between the quality inspection result data and quality attribute value of the workpiece processed by the production equipment;
generating, for given ambient condition data, a set of processing parameters of the production equipment;
determining, for each element in the set and based on the ambient condition data, the element and the first relationship, a quality attribute value of each second simulated workpiece of multiple second simulated workpieces processed based upon the processing parameter represented by the element;
determining, for each element in the set, for each second simulated workpiece of the multiple second simulated workpieces and based on the second relationship and the quality attribute value of the second simulated workpiece determined, quality inspection result data of the second simulated workpiece;
compiling, for each element in the set, statistics of a quality inspection pass rate according to the quality inspection result data determined of each second simulated workpiece of the multiple second simulated workpieces; and
repeating a process until a condition is met, the condition including a number of iterations reaching a maximum number of iterations or a calculated quality inspection pass rate of the workpiece processed by the production equipment reaching a pass rate threshold, the process including:
adding a new element to the set, so that an expected value of the quality inspection pass rate obtained statistically based upon the new element has a relatively largest increase compared with the maximum value of the quality inspection pass rate statistically obtained previously,
determining, for the new element added to the set and based on the ambient condition data, the new element and the first relationship, a quality attribute value of each third simulated workpiece of multiple third simulated workpieces processed based upon the processing parameter represented by the new element,
determining, for the new element added to the set and for each third simulated workpiece of the multiple third simulated workpieces and based on the second relationship and the quality attribute values of the multiple third simulated workpieces determined, quality inspection result data of each third simulated workpiece of the multiple third simulated workpieces, and
compiling, for the new element added to the set, statistics of the quality inspection pass rate according to the quality inspection result data determined of each third simulated workpiece of the multiple third simulated workpieces; and
determining the element corresponding to a maximum value of all quality inspection pass rates obtained statistically as the optimal value of the processing parameter of the production equipment for the ambient condition data, wherein the determining of the first relationship comprises:
using the processing condition data of each workpiece of the multiple workpieces as an input vector of a generator in a Conditional Generative Adversarial Net (CGAN) model;
using the processing condition data of each workpiece of the multiple workpieces as an input vector of a discriminator of the CGAN model;
using the quality attribute value of each workpiece of the multiple workpieces or an output vector of the generator of the CGAN model as another input vector of the discriminator in the CGAN model; and
training the CGAN model, and using the generator of the CGAN model obtained by training as the first relationship.

2. The method of claim 1, wherein the acquiring of the processing condition data, the quality attribute value and the quality inspection result data of each workpiece of the multiple workpieces processed by the piece of production equipment comprises:
acquiring the processing condition data, the quality attribute value and the quality inspection result data of each workpiece of the multiple workpieces processed by the production equipment, so that all of the data acquired covers combinations of ambient condition data and processing parameters.

3. The method of claim 1, further comprising:
based on the processing condition data and the quality attribute value of each workpiece of the multiple workpieces processed by the production equipment and the first relationship, generating a quality attribute value of each workpiece of multiple first simulated workpieces; and
comparing the multiple first simulated workpieces with a distribution of the acquired quality attribute values of the multiple workpieces processed by the production equipment, to determine an accuracy of the first relationship.

4. The method of claim 1, wherein the adding of the new element to the set, comprises:
fitting a Gaussian process according to each element in the set and a quality inspection pass rate corresponding to the element statistically obtained previously; and
using the Gaussian process to calculate the new element.

5. A workpiece data processing apparatus, comprising:
at least one memory to store computer readable code; and
at least one processor to execute the computer readable code stored in the at least one memory to perform at least:
acquiring processing condition data, a quality attribute value and quality inspection result data of each workpiece of multiple workpieces processed by production equipment, the processing condition data of one workpiece including a processing parameter used by the production equipment when processing the workpiece and ambient condition data of the production equipment when processing the workpiece;
determining a first relationship between the quality attribute value of the workpiece processed by the production equipment and the ambient condition data of the production equipment when processing the workpiece and the processing parameter of the production equipment, based on the processing condition data and the quality attribute value of each workpiece of the multiple workpieces; and
determining a second relationship between the quality inspection result data and quality attribute value of the workpiece processed by the production equipment, based on the quality attribute value and the quality inspection result data of each workpiece of the multiple workpieces, wherein the at least one processor is further configured to execute the computer readable code stored in the at least one memory to perform:
randomly generating a set of processing parameters of the production equipment for the ambient condition data;
determining, for each element in the set and based on the given ambient condition data, the element and the first relationship, a quality attribute value of each second simulated workpiece of multiple second simulated workpieces processed based upon the processing parameter represented by the element;
determining, for each element in the set and for each second simulated workpiece of the multiple second simulated workpieces and based on the second relationship and the quality attribute value of the second simulated workpiece determined, quality inspection result data of the second simulated workpiece;
compiling, for each element in the set, statistics of a quality inspection pass rate according to the quality inspection result data of each of the multiple second simulated workpieces determined;
repeating a process until a condition is met, the condition including a number of iterations reaching a maximum number of iterations or a calculated quality inspection pass rate of the workpiece processed by the production equipment reaching a pass rate threshold, the process including:
adding a new element to the set, so that an expected value of the quality inspection pass rate obtained statistically based upon the new element has a relatively largest increase compared with the maximum value of the quality inspection pass rate statistically obtained previously,
determining, for the new element added to the set and based on the ambient condition data, the new element and the first relationship, a quality attribute value of each third simulated workpiece of multiple third simulated workpieces processed based upon the processing parameter represented by the new element,
determining, for the new element added to the set and for each third simulated workpiece of the multiple third simulated workpieces and based on the second relationship and the quality attribute values of the multiple third simulated workpieces determined, quality inspection result data of each third simulated workpiece of the multiple third simulated workpieces, and
compiling, for the new element added to the set, statistics of the quality inspection pass rate according to the quality inspection result data determined of each third simulated workpiece of the multiple third simulated workpieces; and
determining the element corresponding to a maximum value of all quality inspection pass rates obtained statistically as the optimal value of the processing parameter of the production equipment for the ambient condition data, wherein when determining the first relationship, the at least one processor is configured to execute the computer readable code stored in the at least one memory to perform:
using the processing condition data of each workpiece of the multiple workpieces as an input vector of a generator in a Conditional Generative Adversarial Net (CGAN) model;
using the processing condition data of each workpiece of the multiple workpieces as an input vector of a discriminator of the CGAN model;
using the quality attribute value of each workpiece of the multiple workpieces or an output vector of the generator of the CGAN model as another input vector of the discriminator in the CGAN model; and
training the CGAN model, and use the generator of the CGAN model obtained by training as the first relationship.

6. The apparatus of claim 5, wherein the acquiring includes the at least one processor being configured to execute the computer readable code stored in the at least one memory, to perform:
acquiring the processing condition data, the quality attribute value and the quality inspection result data of each workpiece of multiple workpieces processed by the production equipment, so that all acquired data covers combinations of ambient condition data and processing parameters.

7. The apparatus of claim 5, wherein the at least one processor is further configured to execute the computer readable code stored in the at least one memory to perform:
generating a quality attribute value of each first simulated workpiece of multiple first simulated workpieces, based on the processing condition data and the quality attribute value of each workpiece of the multiple workpieces processed by the production equipment and the first relationship; and
comparing the multiple first simulated workpieces with a distribution of the quality attribute values acquired of the multiple workpieces processed by the production equipment, to determine the accuracy of the first relationship.

8. The apparatus of claim 5, wherein when adding a new element to the set, so that an expected value of the quality inspection pass rate obtained statistically based upon the new element has the largest increase compared with the maximum value of the quality inspection pass rate statistically obtained previously, the at least one processor is configured to execute the computer readable code stored in the at least one memory to perform:
fitting a Gaussian process according to each element in the set and the quality inspection pass rate corresponding to the element statistically obtained previously; and
using the Gaussian process to calculate the new element.

9. A processing parameter setting method, comprising:
generating, for ambient condition data, a set of processing parameters of production equipment;
determining, for each element in the set and based on the ambient condition data, an element and a first relationship, a quality attribute value of each second simulated workpiece of multiple second simulated workpieces processed based upon a processing parameter, of the set of processing parameters, represented by the element, wherein the first relationship is a relationship between the quality attribute value of a workpiece processed by the production equipment and the ambient condition data of the production equipment when processing the workpiece and the processing parameter of the production equipment;
determining, for each element in the set, for each second simulated workpiece of the multiple second simulated workpieces and based on a second relationship and the quality attribute value of the second simulated workpiece determined, quality inspection result data of the second simulated workpiece, wherein the second relationship is a relationship between the quality inspection result data and quality attribute value of the workpiece processed by the production equipment;
compiling, for each element in the set, statistics of a quality inspection pass rate according to the quality inspection result data determined of each second simulated workpiece of the multiple second simulated workpieces;
repeating a process until a preset condition is met, the preset condition including a number of iterations reaching a maximum number of iterations or a calculated quality inspection pass rate of the workpiece processed by the production equipment reaching a pass rate threshold, the process including:
adding a new element to the set, so that an expected value of the quality inspection pass rate obtained statistically based upon the new element has the largest increase compared with a maximum value of the quality inspection pass rate statistically obtained previously,
determining, for the new element added to the set and based on the ambient condition data, the new element and the first relationship, a quality attribute value of each third simulated workpiece of multiple third simulated workpieces processed based upon the processing parameter represented by the new element,
determining for the new element added to the set, for each third simulated workpiece of the multiple third simulated workpieces, and based on the second relationship and the quality attribute values of the multiple third simulated workpieces determined, quality inspection result data of each third simulated workpiece of the multiple third simulated workpieces,
compiling for the new element added to the set, statistics of a quality inspection pass rate according to the quality inspection result data determined of each third simulated workpiece of the multiple third simulated workpieces; and
determining the element corresponding to a maximum value of all quality inspection pass rates obtained statistically as an optimal value of the processing parameter of the production equipment for the ambient condition data, wherein the determining of the first relationship comprises:
using the processing condition data of each second simulated workpiece of the multiple second simulated workpieces as an input vector of a generator in a Conditional Generative Adversarial Net (CGAN) model;
using the processing condition data of each second simulated workpiece of the multiple second simulated workpieces as an input vector of a discriminator of the CGAN model;
using the quality attribute value of each second simulated workpiece of the multiple second simulated workpieces or an output vector of the generator of the CGAN model as another input vector of the discriminator in the CGAN model; and
training the CGAN model, and using the generator of the CGAN model obtained by training as the first relationship.

10. The method of claim 9, wherein the adding of the new element to the set, comprises:
fitting a Gaussian process according to each element in the set and the quality inspection pass rate corresponding to the element statistically obtained previously; and
using the Gaussian process to calculate the new element.

* * * * *